(12) United States Patent
Smith

(10) Patent No.: US 7,213,858 B2
(45) Date of Patent: May 8, 2007

(54) TAILGATE SUPPORT STRUCTURE WITH LATERAL TAILGATE ADJUSTMENT

(75) Inventor: Michael Smith, Highland, MI (US)

(73) Assignee: Nissan Technical Center North America, Inc. MI (US)

( * ) Notice: Subject to any disclaimer, the term of this patent is extended or adjusted under 35 U.S.C. 154(b) by 103 days.

(21) Appl. No.: 11/094,501

(22) Filed: Mar. 31, 2005

(65) Prior Publication Data
US 2006/0220409 A1    Oct. 5, 2006

(51) Int. Cl.
B62D 33/027    (2006.01)

(52) U.S. Cl. .................................. 296/57.1; 16/243

(58) Field of Classification Search .............. 296/50, 296/57.1, 59, 60; 16/239, 240, 241, 243; 49/381, 389, 397
See application file for complete search history.

(56) References Cited

U.S. PATENT DOCUMENTS

| | | | | |
|---|---|---|---|---|
| 2,990,215 A | * | 6/1961 | May ........................... | 296/57.1 |
| 3,734,560 A | * | 5/1973 | Cramblet ...................... | 296/50 |
| 3,848,918 A | * | 11/1974 | Dyer .......................... | 296/57.1 |
| 3,895,838 A | * | 7/1975 | Hamada ..................... | 296/57.1 |
| 5,358,301 A | * | 10/1994 | Konchan et al. ......... | 296/146.1 |
| 5,988,724 A | | 11/1999 | Wolda | |
| 6,098,265 A | * | 8/2000 | Stojkovic et al. ............. | 29/464 |
| 6,637,796 B1 | | 10/2003 | Westerdale et al. | |
| 6,796,592 B1 | | 9/2004 | Austin | |
| 2005/0200150 A1 | * | 9/2005 | Austin ........................... | 296/50 |
| 2006/0055197 A1 | * | 3/2006 | Austin ........................... | 296/50 |

FOREIGN PATENT DOCUMENTS

DE    3122246 A1 *    12/1982    ................. 296/50

* cited by examiner

*Primary Examiner*—D. Glenn Dayoan
*Assistant Examiner*—Paul Chenevert
(74) *Attorney, Agent, or Firm*—Global IP Counselors (57) ABSTRACT

A tailgate support structure is formed by a rear vehicle structure that pivotally supports a tailgate using first and second hinge assemblies. The rear vehicle structure has a pair of laterally spaced side supports that pivotally support the tailgate between an upright closed position and a horizontal open position. The first and second hinge assemblies have first and second lateral adjusters that adjust a lateral position of the tailgate along the pivot axis between the first and second side supports. The first and second lateral adjusters are configured to center the tailgate between the side supports so as to form equal gaps on each side of the tail gate and the respective side support. Also preferably, the first and second lateral adjusters are configured to take up lateral play so that the tailgate does not move laterally between the first and second side supports.

31 Claims, 11 Drawing Sheets

TAILGATE SUPPORT STRUCTURE WITH LATERAL TAILGATE ADJUSTMENT

BACKGROUND OF THE INVENTION

1. Field of the Invention

The present invention generally relates to an adjustment structure for a tailgate. More specifically, the present invention relates to a tailgate adjustment structure that centers a tailgate between two side portions of a tailgate support structure and reducing side-to-side endplay of the tailgate between the portions of the tailgate support structure.

2. Background Information

Pick-up trucks have increased in popularity in recent years. Basically a pick-up truck has a storage bed in which a tailgate is pivotally mounted to side support portions of the storage bed. Tailgates in vehicles such as pickup trucks are typically designed to include a gap between the sides of the tailgate and the side support portions of the vehicle. One problem that often arises is the centering of the tailgate between the side support portions. This problem can result in the tailgate having an awkward appearance if not adequately centered between the side support portions.

Further, the hinge assemblies on such tailgates can sometimes have endplay where the tailgate can move from side-to-side between the side supports. When there is sufficient endplay, the tailgate can rattle when the vehicle goes over a bump or is being driven on a rough road. This noise can be annoying to the passengers.

In view of the above, it will be apparent to those skilled in the art from this disclosure that there exists a need for an improved hinge assembly for a tailgate that includes lateral adjustment for centering the tailgate and/or reducing endplay of the hinge assembly. This invention addresses this need in the art as well as other needs, which will become apparent to those skilled in the art from this disclosure.

SUMMARY OF THE INVENTION

It has been discovered that in order to center a tailgate and eliminate or reduce endplay of the tailgate, lateral adjustment is needed in the tailgate hinge assembly.

One object of the present invention is to provide a tailgate support structure that includes lateral adjustment of a tailgate.

Another object of the present invention is to provide a tailgate support structure that is configured and arranged to reduce or eliminate endplay in a tailgate.

Yet another object of the present invention is to provide a tailgate support structure that is configured and arranged to compensate for production tolerances by including lateral adjustments in the hinge assemblies of a tailgate.

In accordance with one aspect of the present invention, a tailgate support structure is provided that basically includes a rear vehicle structure, a tailgate, a first hinge assembly and a second hinge assembly. The rear vehicle structure includes generally upright spaced apart first and second side supports. The tailgate is pivotally disposed between the first and second side supports to pivot about a pivot axis between an upright closed position and a horizontal open position. The tailgate includes a first end and a second end. The first hinge assembly pivotally supports the first end of the tailgate to the first side support. The first hinge assembly includes a first side mounting part and a first tailgate mounting part. The first side mounting part is coupled to the first side support and the first tailgate mounting part is coupled to the first end of the tailgate. One of the first side mounting part and the first tailgate mounting part has a first lateral adjuster. The first lateral adjuster is arranged and configured to adjust a lateral position of the tailgate along the pivot axis between the first and second side supports. The second hinge assembly pivotally supports the second end of the tailgate to the second side support. The second hinge assembly includes a second side mounting part and a second tailgate mounting part. The second side mounting part is coupled to the second side support and the second tailgate mounting part is coupled to the second end of the tailgate. One of the second side mounting part and the second tailgate mounting part has a second lateral adjuster. The second lateral adjuster is arranged and configured to adjust the lateral position of the tailgate along the pivot axis between the first and second side supports.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
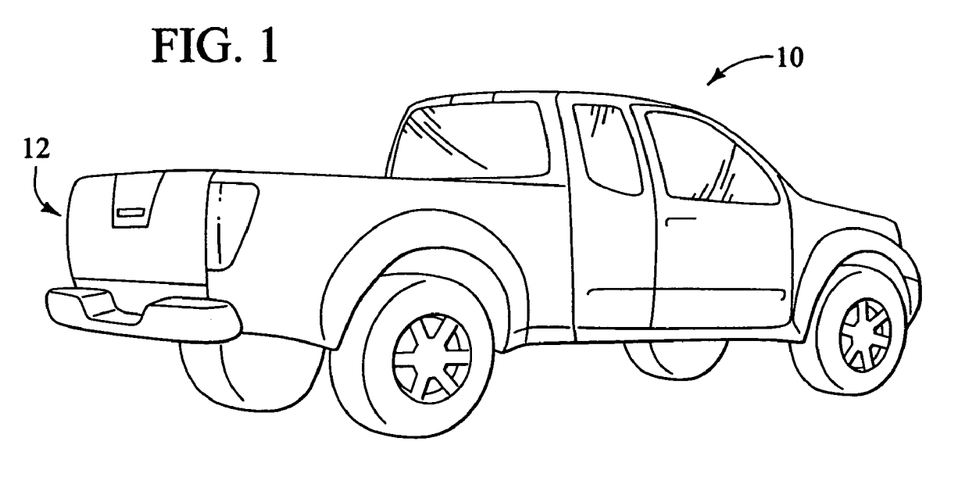
FIG. 1 is a perspective view of a vehicle having a tailgate support structure in accordance with the present invention.

Referring initially to FIG. 1, a vehicle 10 is illustrated having a tailgate support structure 12 in accordance with a first embodiment of the present invention. The tailgate support structure 12 is located in a rearward portion of the vehicle 10. In a preferred embodiment, the vehicle 10 is a pickup truck. However, it should be understood from the drawings and description below, the tailgate support structure 12 of the present invention can be utilized in any of a variety of vehicles, such as vans and other vehicles having a pivotal door or gate member.

Figure 2:
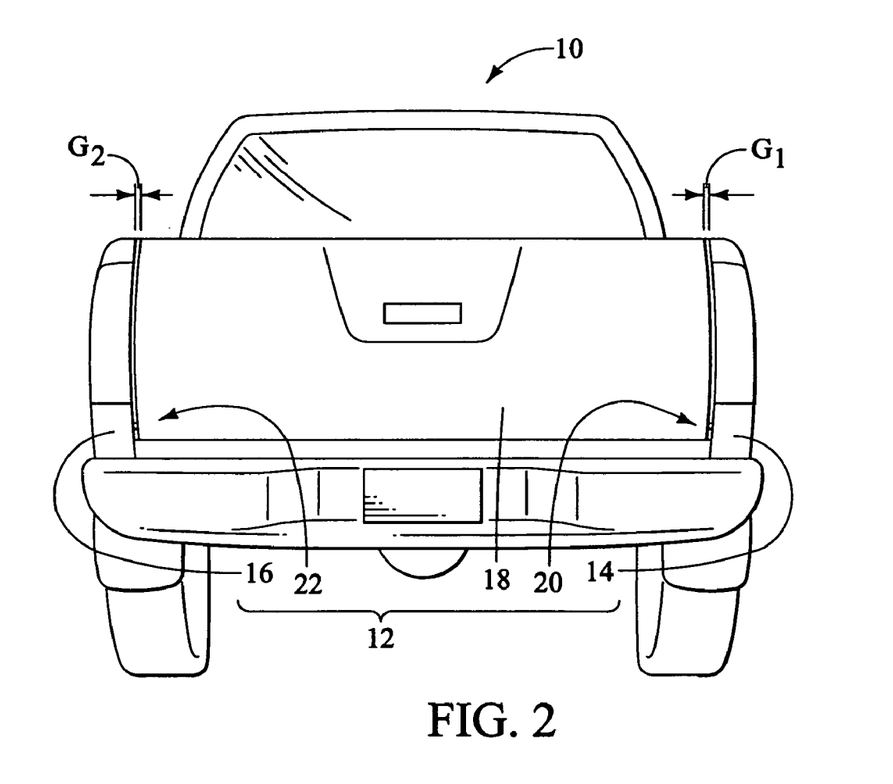
FIG. 2 is a rear elevational view of the vehicle having the a tailgate support structure in accordance with the present invention.
Figure 7:
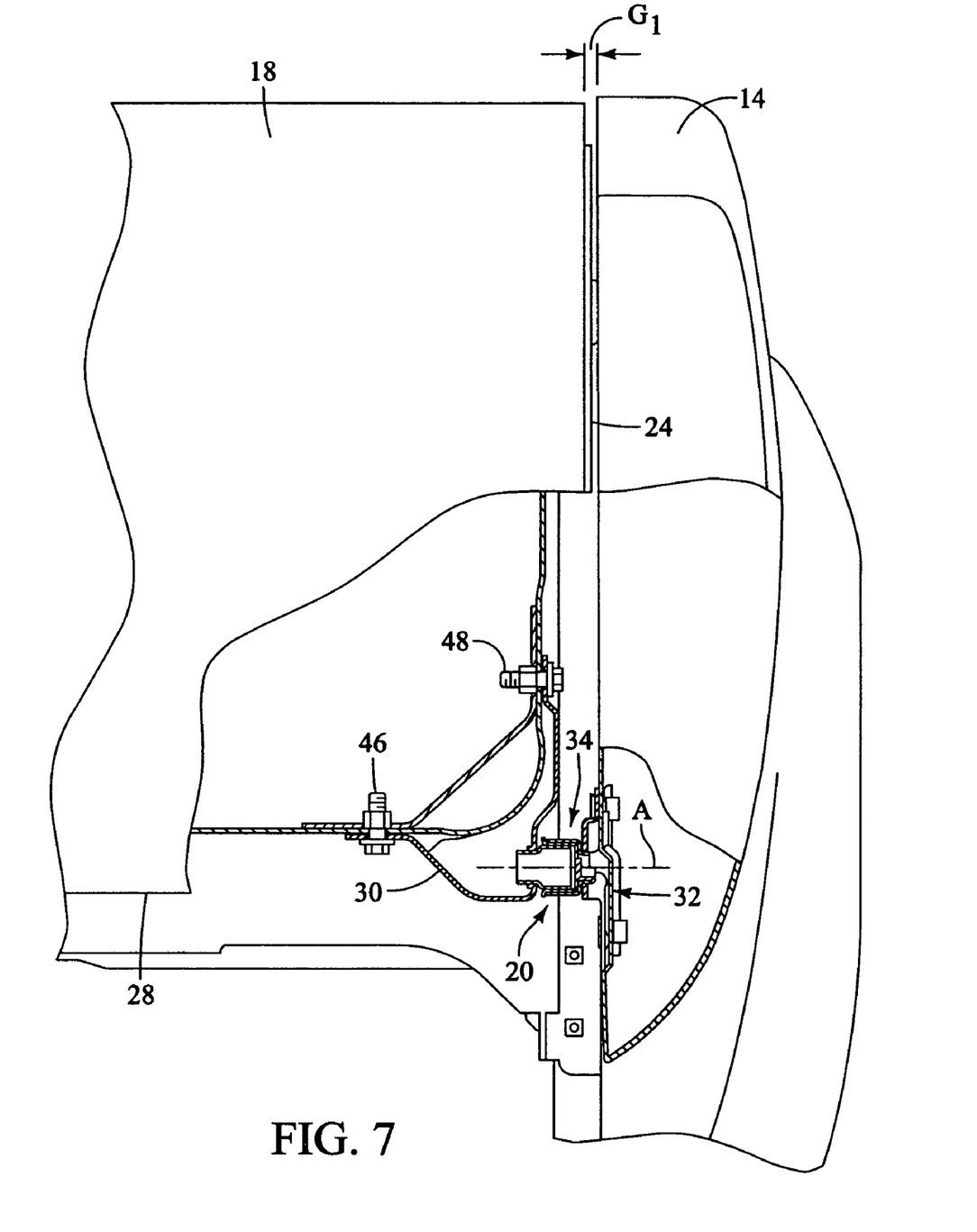
FIG. 7 is a rear elevational view and partial cutaway of a first portion of the rear of the vehicle, with elements of the vehicle removed, to show details of a first portion of the tailgate support structure in accordance with the present invention.
Figure 8:
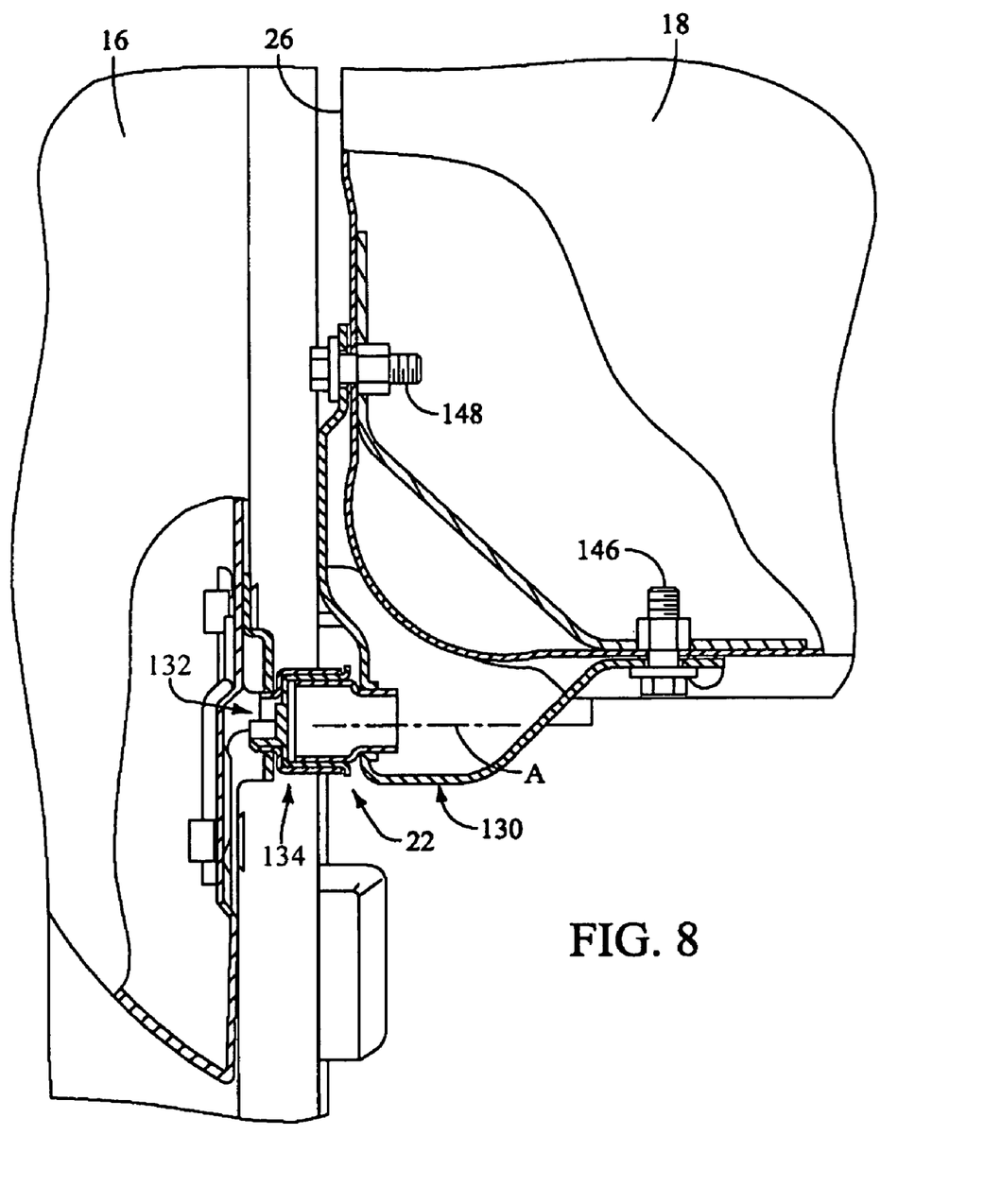
FIG. 8 is a rear elevational view and partial cutaway of a second portion of the rear of the vehicle, with elements of the vehicle removed, to show details of a second portion of the tailgate support structure in accordance with the present invention.

As shown in FIGS. 2, 7 and 8, the tailgate support structure 12 includes a first side support 14, a second side support 16, a tailgate 18, a first hinge assembly 20 and a second hinge assembly 22. As shown in FIG. 2, the tailgate 18 forms a pair of lateral gaps $G_1$ and $G_2$ with respect to the first and second side supports 14 and 16. As explained below, the first and second hinge assemblies 20 and 22 are configured and arranged to be laterally adjusted to compensate for production tolerances such that the lateral gaps $G_1$ and $G_2$ can be made substantially equal, and/or lateral play in the tailgate 18 can be substantially reduced or eliminated.

The first side support 14 and the second side support 16 are generally upright spaced apart members that can be any of a variety of structures, such as truck walls, truck bed walls or van walls. However, in the first embodiment shown in the FIGS. 1 and 2, the first and second side supports 14 and 16 are generally upright, spaced apart walls of a pickup truck bed, such as those of the vehicle 10.

Figure 3:
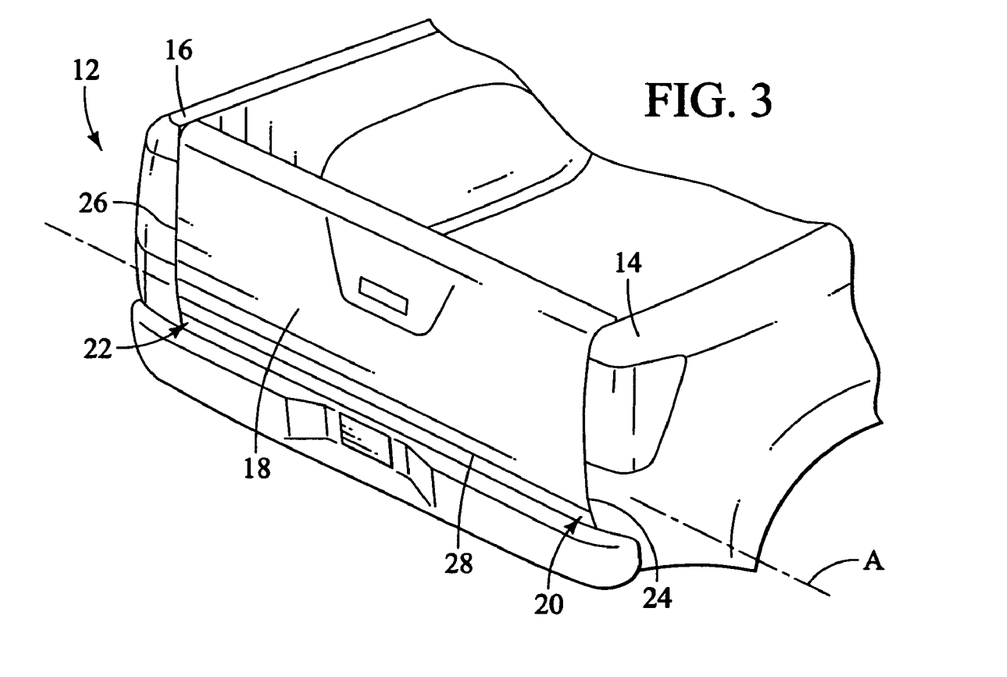
FIG. 3 is a perspective view of the rear of the vehicle showing a tailgate of the tailgate support structure, with the tailgate in an upright closed position in accordance with the present invention.
Figure 4:
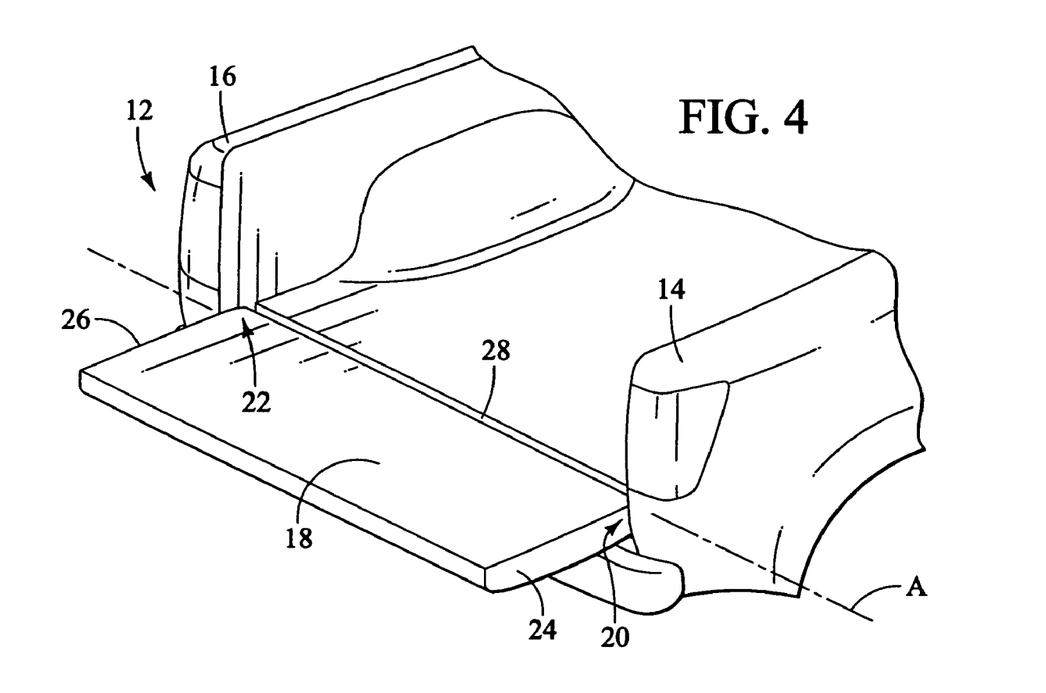
FIG. 4 is a perspective view of the vehicle similar to FIG. 3, showing the tailgate in a lowered open position in accordance with the present invention.
Figure 5:
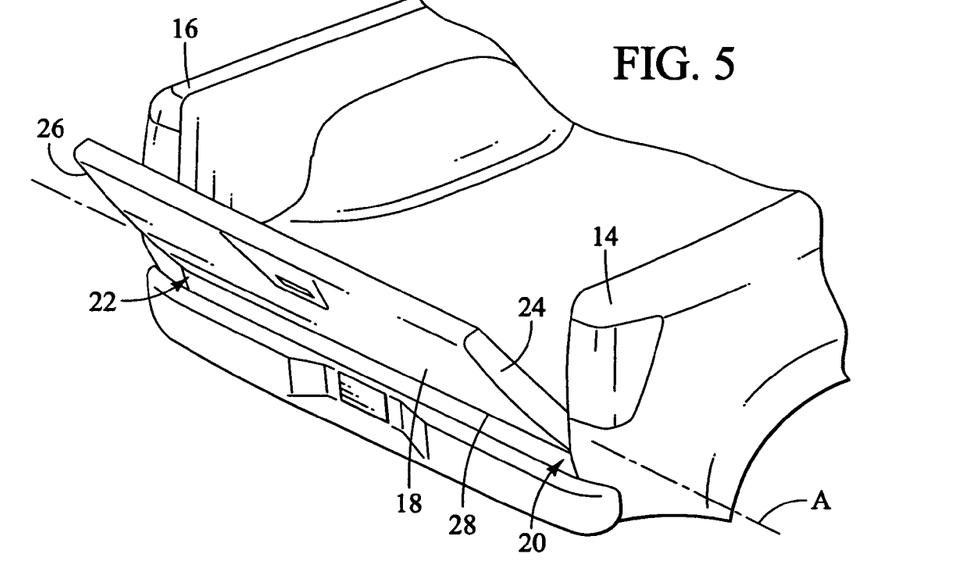
FIG. 5 is another perspective view of the vehicle similar to FIG. 3, showing the tailgate in an intermediate position in accordance with the present invention.
Figure 6:
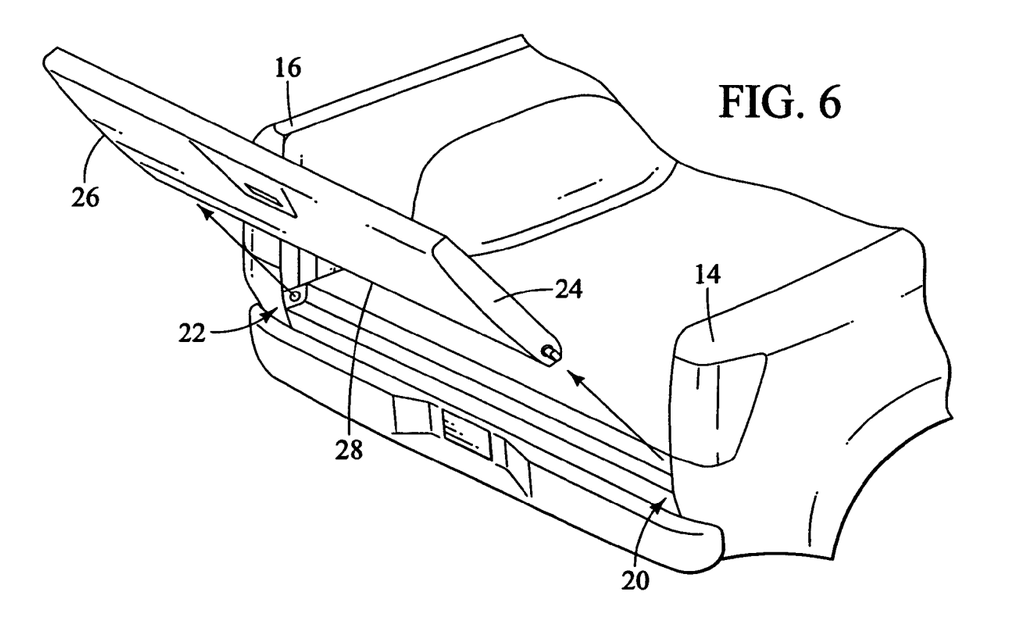
FIG. 6 is another perspective view of the vehicle similar to FIG. 5, showing the tailgate removed from the tailgate support structure of the vehicle in accordance with the present invention.

As shown in FIGS. 3 and 4, the tailgate 18 is pivotally disposed between the first and second side supports 14 and 16 to pivot about a pivot axis A (as best shown in FIGS. 7 and 8) between an upright closed position and a horizontal open position. With the tailgate 18 in an intermediate position shown in FIG. 5, the tailgate 18 can also be removed from the tailgate support structure 12, as shown in FIG. 6, which is explained in greater detail below.

As shown in FIGS. 3–6, the tailgate 18 includes a first lateral end 24, a second lateral end 26 and a bottom pivotal portion 28. As shown in FIG. 7, the first hinge assembly 20 pivotally supports the first lateral end 24 of the tailgate 18 on the first side support 14. As shown in FIG. 8, the second hinge assembly 22 pivotally supports the second lateral end 26 of the tailgate 18 on the second side support 16. The tailgate 18 is laterally adjusted between the first and second side supports 14 and 16 by the first and second hinge assemblies 20 and 22 to center the tailgate 18 therebetween. In other words, the lateral gaps $G_1$ and $G_2$ between the first and second side supports 14 and 16 of the tailgate support structure 12 and the first and second lateral ends 24 and 26 of the tailgate is adjusted to be substantially equal to each other. Moreover, the lateral play in the tailgate 18 is adjusted by the first and second hinge assemblies 20 and 22 as explained below.

Figure 9:
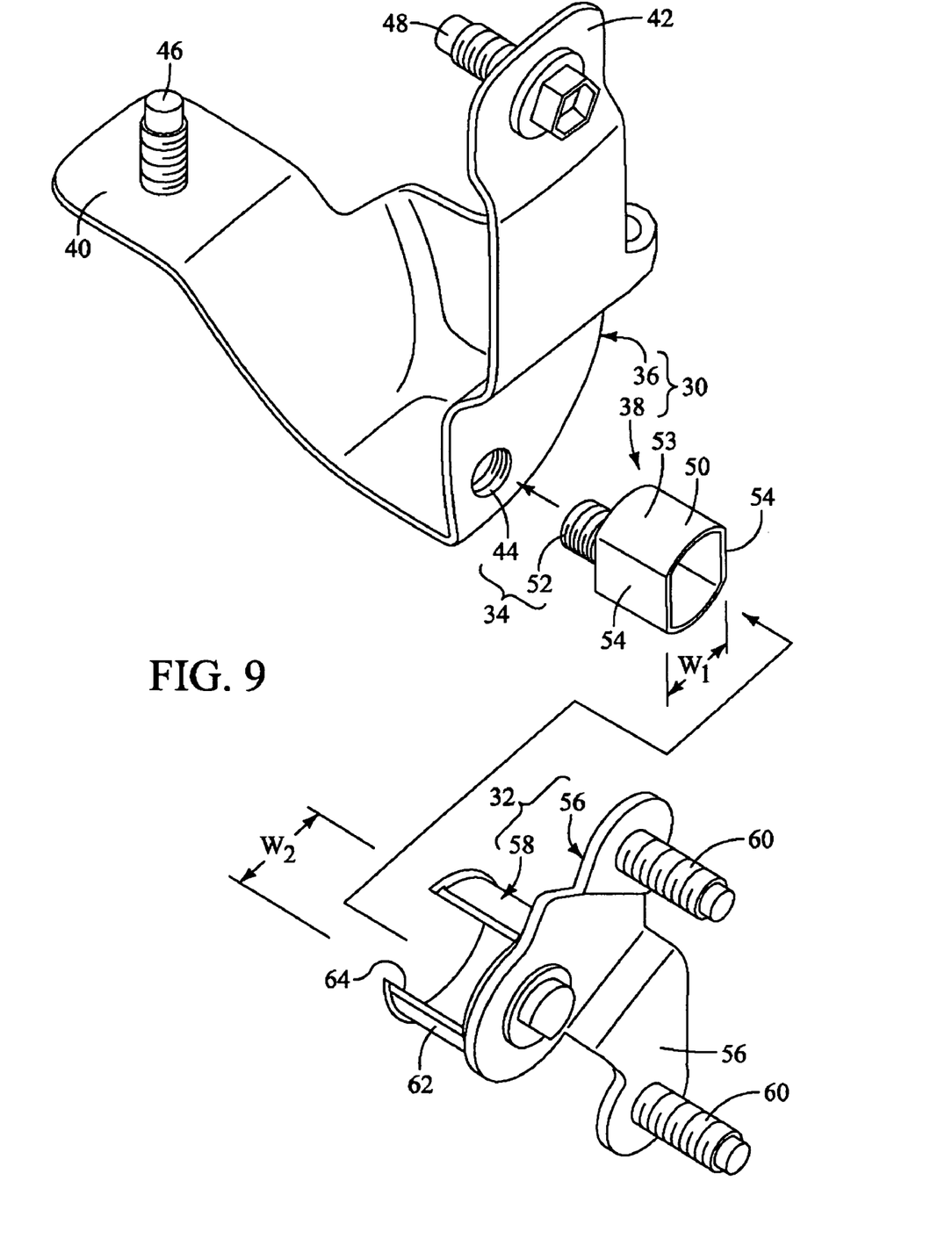
FIG. 9 is an exploded perspective view showing details of a first hinge assembly of the first portion of the tailgate support structure depicted in FIG. 7 in accordance with the present invention.
Figure 10:
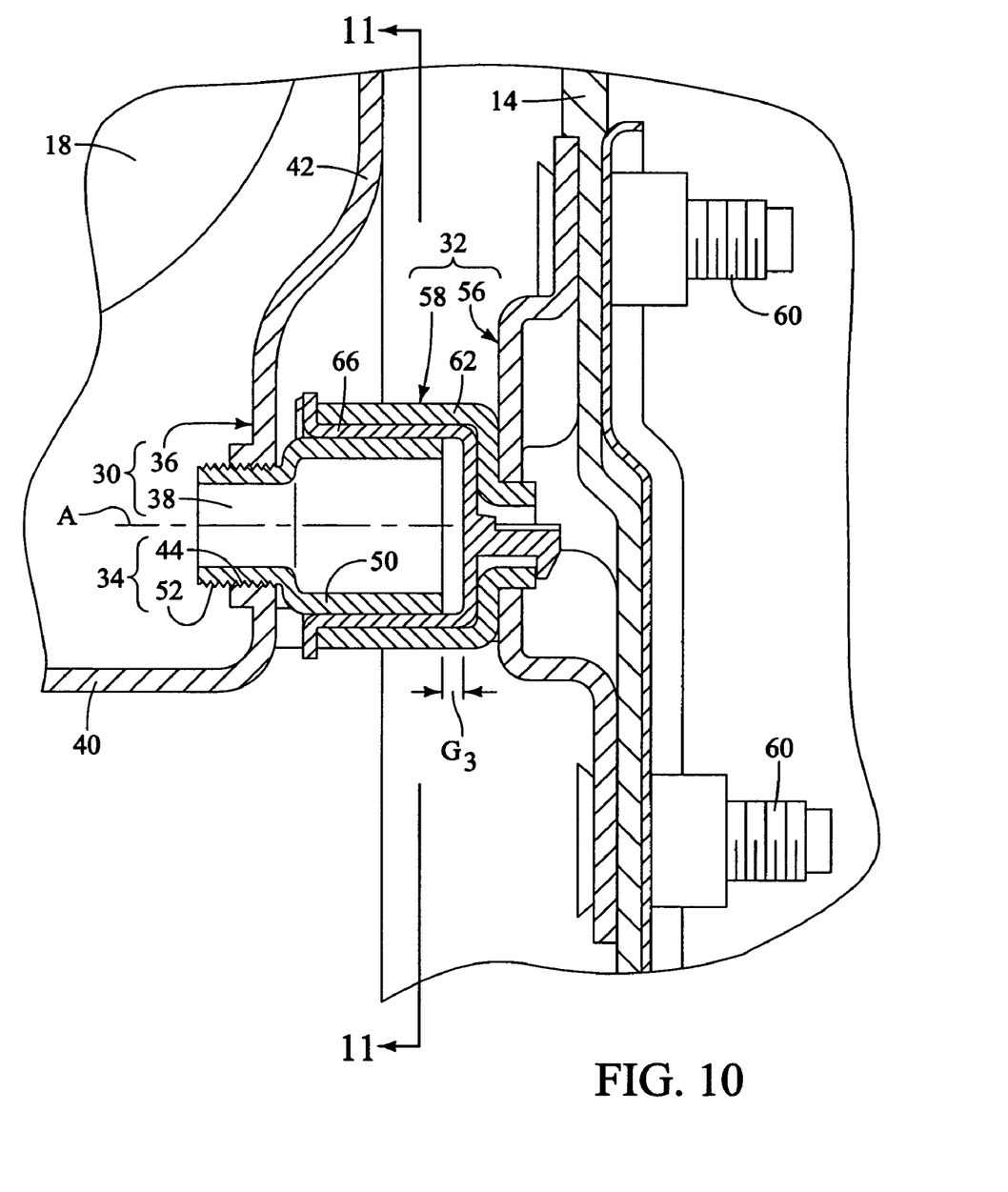
FIG. 10 is an enlarged partial cross-sectional view of one side of the tailgate support structure showing details of the first hinge assembly of the first portion of the tailgate support structure depicted in FIG. 7 in accordance with the present invention.

Referring now to FIGS. 7, 9 and 10, the first hinge assembly 20 basically includes a first tailgate mounting part 30, a first side mounting part 32 and a first lateral adjuster 34. The first tailgate mounting part 30 is coupled to and supported on the first lateral end 24 of the tailgate 18, while the first side mounting part 32 is coupled to and supported on the first side support 14. In the illustrated embodiment, the first lateral adjuster 34 is formed as part of the first tailgate mounting part 30. However, it will be apparent to those skilled in the art from this disclosure that the first lateral adjuster 34 can be part of the first side mounting part 32 if needed and/or desired.

As is described in greater detail below, at least one of the first tailgate mounting part 30 and the first side mounting part 32 includes a portion with a non-uniform periphery that cooperates with the other of the first tailgate mounting part 30 and the first side mounting part 32. Further, the portion having the non-uniform periphery has a predetermined shape that defines at least one non-use orientation and two final use orientations. The first lateral adjuster 34 is configured and arranged to move the one of the first side mounting part 30 and the first tailgate mounting part 32 having the non-uniform periphery between non-use orientation and final use orientation in the process of adjusting the lateral position of the tailgate 18.

As shown more clearly in FIGS. 9 and 10, the first tailgate mounting part 30 of the first hinge assembly 20 basically includes a generally L-shaped bracket 36 and a pivot pin 38, while the first side mounting part 32 of the first hinge assembly 20 basically includes a bracket 56 and a cup 58.

Turning first to the first tailgate mounting part 30 of the first hinge assembly 20, the L-shaped bracket 36 is fixedly coupled to the first lateral end 24 of the tailgate 18, while the pivot pin 38 is movably coupled to the L-shaped bracket 36 to move in an axial direction of the pivot pin 38. In particular, the first lateral adjuster 34 is partially formed as a part of the L-shaped bracket 36 and partially formed as a part of the pivot pin 38 such that the pivot pin 38 moves in an axial direction of the pivot pin 38 relative to the L-shaped bracket 36.

The L-shaped bracket 36 of the first tailgate mounting part 30 basically includes a lower flange 40 and a side flange 42 with a threaded aperture 44 (FIG. 10). The lower flange 40 includes an aperture for a fastener 46 that fixes the L-shaped bracket 36 to the bottom pivotal portion 28 of the tailgate 18 (FIG. 7). The side flange 42 includes an aperture for a fastener 48 that fixes the L-shaped bracket 36 to the first lateral end 24 of the tailgate 18 (FIG. 7). The threaded aperture 44 is located towards the bottom of the side flange 42 to form part of the pivot axis A.

Figure 11:
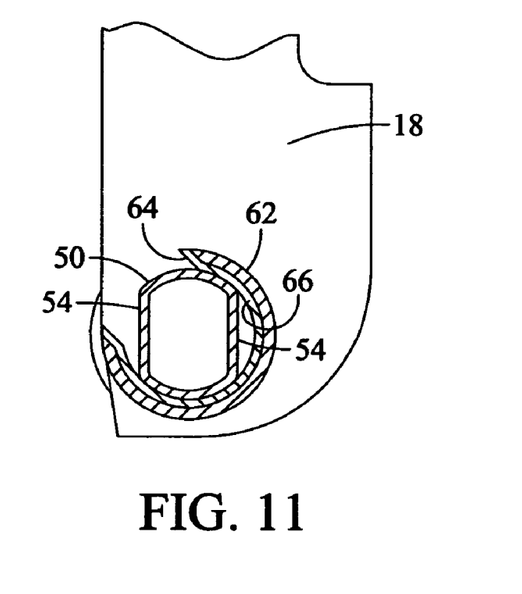
FIG. 11 is a partial cross-sectional view of the first portion of the tailgate support structure taken along section line 11—11 in FIG. 10 with the tailgate in the upright closed position in accordance with the present invention.

As shown in FIG. 9, the pivot pin 38 is an elongated member that basically includes a pivot shaft 50 and a threaded fixing portion 52 integrally formed with the pivot shaft 50. In the depicted embodiment, the pivot shaft 50 has an outer circumferential surface 53 that forms the above mentioned non-uniform periphery, e.g., non-circular peripheral surface. Specifically, the pivot shaft 50 is formed with two generally parallel surfaces 54 that interrupt the outer circumferential surface 53. The parallel surfaces 54 are spaced apart from one another by a first width $W_1$ (see FIGS. 9 and 12). The pivot shaft 50 of the pivot pin 38 is oriented in a final use orientation when the parallel surfaces 54 are generally parallel with the inside and outside working surfaces of the tailgate 18. In other words, with the tailgate 18 in the upright closed position (FIG. 3) the parallel surfaces 54 are in their final use orientations when they are also in an upright, vertical position, as shown in FIGS. 9 and 11. Consequently, the first lateral adjuster 34 is arranged and configured for adjustment in 180° rotational increments in order to maintain one of the final use orientations. The parallel surfaces 54 of the pivot shaft 50 also aid in rotating the pivot pin 38. In other words, the parallel surfaces 54 of the pivot shaft 50 act as tool engagement surfaces for rotating the pivot pin 38.

The threaded portion 52 is arranged and configured to be threaded into the threaded aperture 44 of the L-shaped bracket 36. By rotating the pivot pin 38, the external threads of the threaded portion 52 of the pivot pin 38 engage the internal threads of the threaded aperture 44 of the L-shaped bracket 36 for adjusting the lateral position of the pivot pin 38 along the pivot axis A. This lateral (axial) movement of the pivot pin 38 cause a free end of the pivot pin 38 to engage the first side mounting part 32 such that the tail gate 18 is laterally adjusted towards the second side support 16. Preferably, the pivot pin 38 is rotated until the lateral gaps $G_1$ and $G_2$ are equal when the tailgate is centered and an appropriate amount of end play or gap $G_3$ is provide between the first tailgate mounting part 30 and the first side mounting part 32.

Thus, the first lateral adjuster 34 is basically a course adjustment mechanism that is constituted by the threaded aperture 44 in the L-shaped bracket 36 and the threaded portion 52 of the pivot pin 38. In conjunction with the second lateral adjuster 34, the first lateral adjuster 34 is configured to adjust the lateral gaps $G_1$ and $G_2$ between the first and second side supports 14 and 16 of the tailgate support structure 12 and the first and second lateral ends 24 and 26 of the tailgate such that they are substantially equal to each other. The first lateral adjuster 34 can also be adjusted to take up endplay between the first side mounting part 32 and the first tailgate mounting part 34 to reduce or eliminate the lateral play in the first and second hinge assemblies 20 and 22. In other words, preferably, the first lateral adjuster 34 provides centering adjustment for the tailgate 18 between the first and second side supports 14 and 16 as well as reducing or eliminating lateral play between the tailgate 18 and the first and second side supports 14 and 16.

As mentioned above, the pivot pin 38 and the threaded portion 52 are integrally formed. Since the threaded portion 52 of the pivot pin 38 constitutes a portion of the first lateral adjuster 34, the pivot pin 38 is rigidly supported by the first lateral adjuster 34. Also, since the pivot pin 38 includes the two parallel surfaces 54, the threaded portion 52 of the first lateral adjuster 34 is arranged and configured to have two final use orientations that are adjusted in 180° rotational increments. When the two parallel surfaces 54 are in any position other than the two final use orientations, then the threaded portion 52 of the first lateral adjuster 34 is in a non-final use orientation.

Once the first lateral adjuster 34 is adjusted, the threaded portion 52 is fixed in position within the threaded aperture 44 of the L-shaped bracket 36 by a thread locking material. The thread locking material is typically applied to the threaded portion 52 prior to insertion of the threaded portion 52 into the threaded aperture 44. The thread locking material can be any of a variety of materials, for example conventional thread locking compounds readily available on the market or a mild adhesive material. Preferably, the thread locking material hardens when exposed to elevated temperatures such that the thread locking material will hard during one of the manufacturing processes of in manufacturing the vehicle 10.

Figure 12:
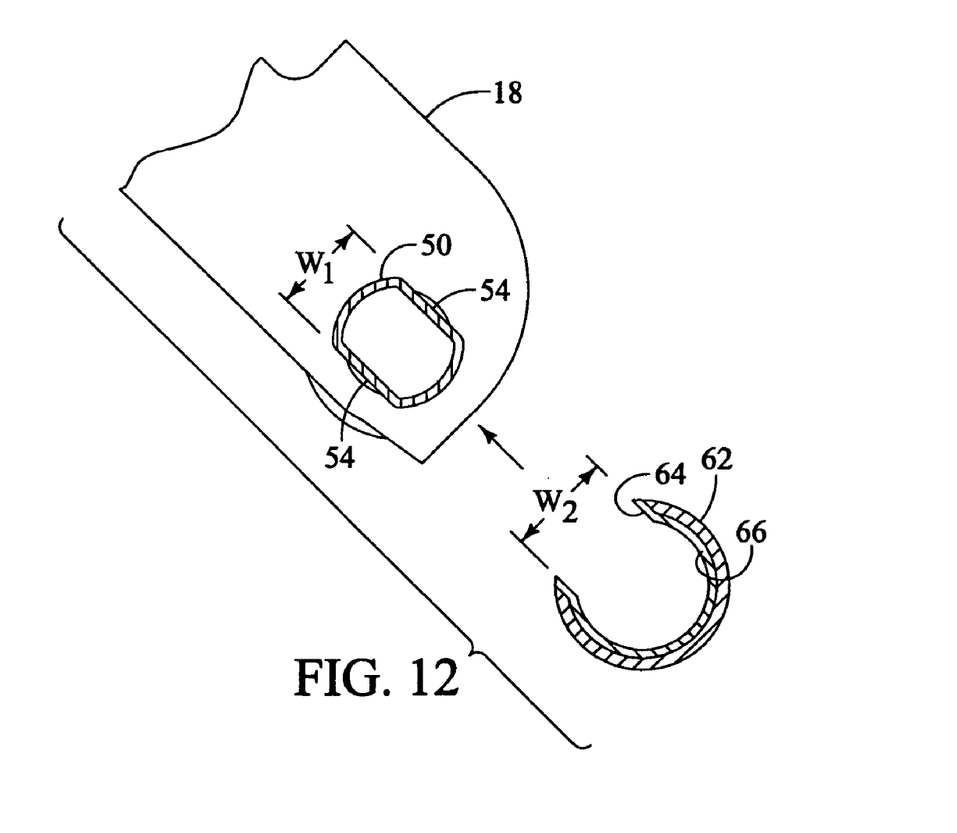
FIG. 12 is another partial cross-sectional view, similar to FIG. 11, of the first portion of the tailgate support structure with the tailgate in the removed position in accordance with the present invention.

Turning now to the first side mounting part 32 of the first hinge assembly 20, which basically includes the bracket 56 and the cup 58, as shown in FIGS. 9 and 10. The bracket 56 is fixed to the first side support 14 by a pair of fasteners 60. The cup 58 is fixedly attached to the bracket 56 by welding, or mechanically deforming (as shown). The cup 58 includes an annular shaped wall 62 formed with a gap 64. The interior of the annular shaped wall 62 is fitted with a correspondingly shaped bushing 66. In a circumferential direction of the cup 58, the gap 64 has a second width $W_2$. As is shown in FIGS. 9 and 12, the second width $W_2$ is slightly larger than the first width $W_1$ thereby allowing removal and installation of the pivot shaft 50 of the pivot pin 38 in and out of the cup 58. Specifically, with the tailgate 18 pivoted to the intermediate position shown in FIG. 5, the pivot shaft 50 of the pivot pin 38 is removable from the cup 58. As shown in FIGS. 6 and 12, the parallel surfaces 54 of the pivot shaft 50 of the pivot pin 38 are able to slip through the gap 64 in the cup 58. More specifically, with the parallel surfaces 54 oriented generally perpendicular to the circumferential direction of the gap 64 in the cup 58, the pivot pin 38 is removable from the cup 58. However, with the tailgate 18 in either the upright closed position (FIGS. 5 and 11) or in the open position (FIG. 6), the pin pivot 38 is retained in the cup 58.

For optimal use, removability and re-installation of the tailgate 18, the gap 64 in the cup 58 is oriented in the configuration depicted in FIGS. 11 and 12, and the parallel surfaces 54 on the pivot shaft 50 are in their final use orientation. If the parallel surfaces are in a non-final use orientation (not shown) then removal and installation of the tailgate 18 can be more difficult. Therefore, in adjustment of the lateral gaps $G_1$ and $G_2$ by rotating the pivot pin 38, positioning of the parallel surfaces 54 in one of the two final use orientations is preferably and advantageous.

It should be understood from the drawings and the description herein that either one of the first side mounting part 32 or the first tailgate mounting part 30 can include the cup 58. As well, either one of the first side mounting part 32 or the first tailgate mounting part 30 can include the pivot pin 38. Thus, the locations of the pivot pin 38 and the cup 58 are interchangeable.

Figure 13:
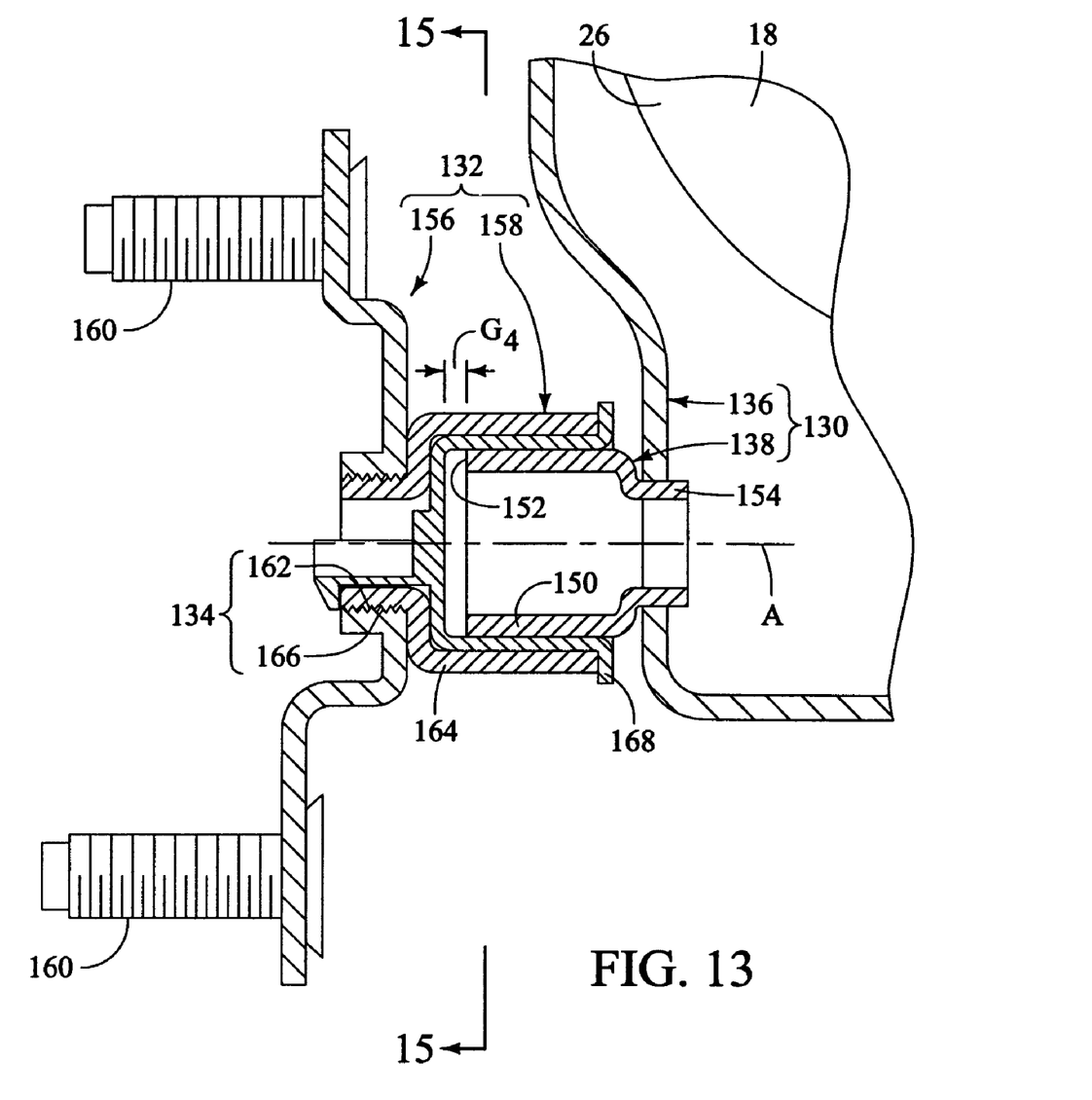
FIG. 13 is a partial cross-sectional view showing details of a second hinge assembly of the second portion of the tailgate support structure depicted in FIG. 8, on an enlarged scale in accordance with the present invention.
Figure 14:
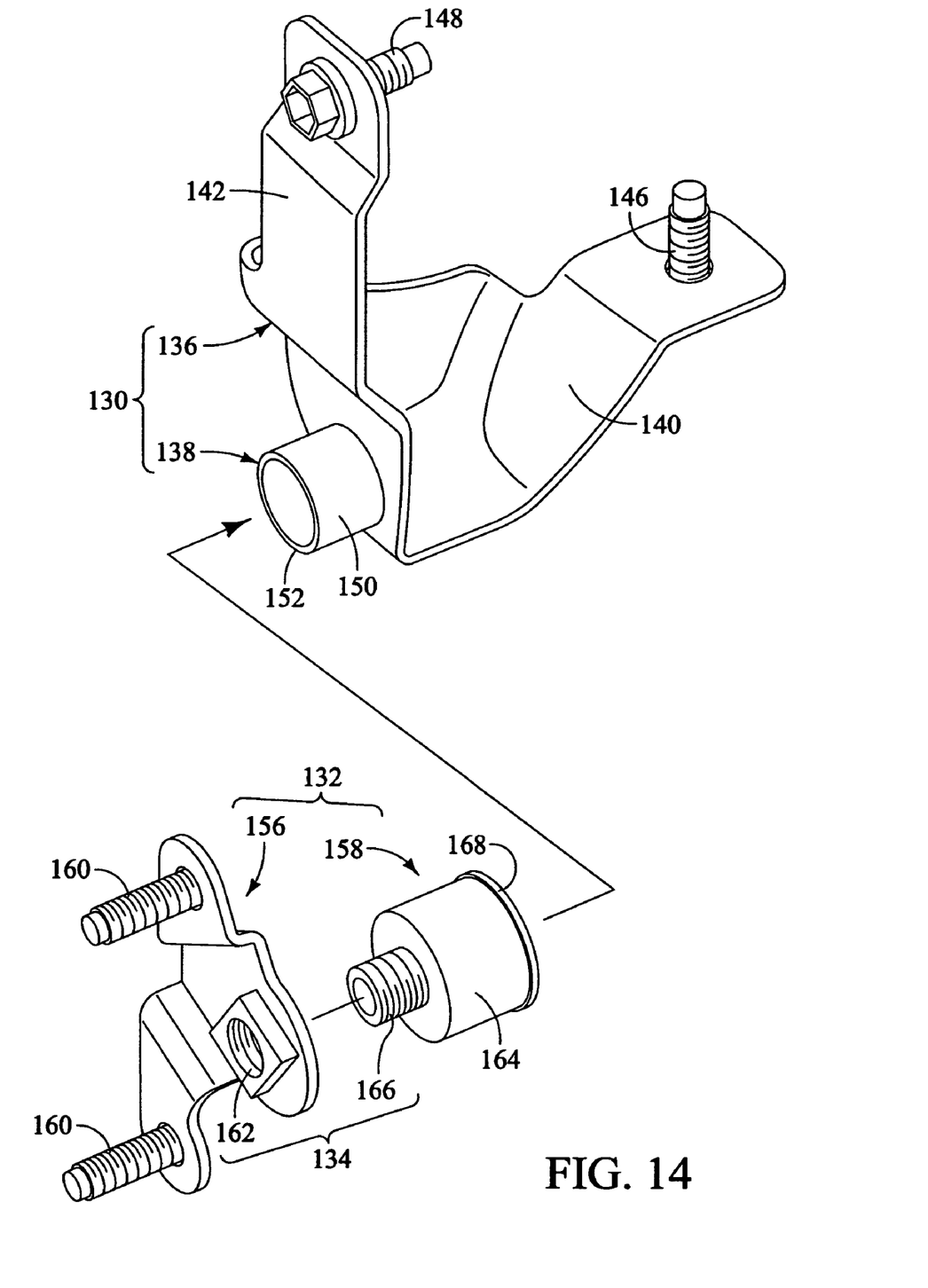
FIG. 14 is an exploded perspective view showing details of the second hinge assembly depicted in FIG. 13 in accordance with the present invention.
Figure 15:
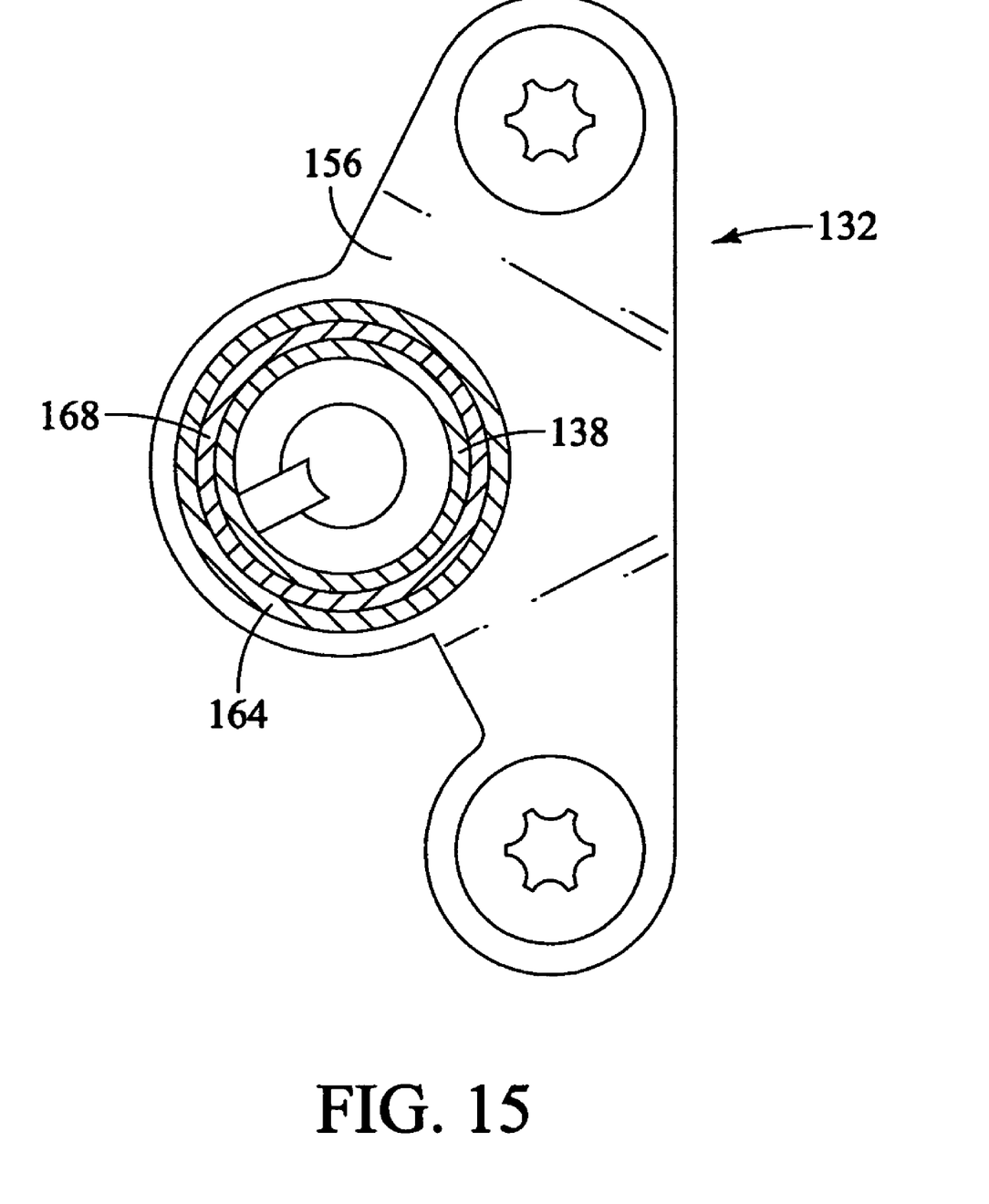
FIG. 15 is a cross-sectional view of the second portion of the tailgate support structure taken along section line 15—15 in FIG. 13 in accordance with the present invention.

Description is now provided for the second hinge assembly 22 with specific reference to FIGS. 8, 13 and 14. The second hinge assembly 22 includes a second tailgate mounting part 130, a second side mounting part 132 and a second lateral adjuster 134. The second tailgate mounting part 130 is coupled to and supported on the second lateral end 26 of the tailgate 18, while the second side mounting part 132 is coupled to and supported on the second side support 16. In the illustrated embodiment, the second lateral adjuster 134 is formed as part of the second side mounting part 132.

However, it will be apparent to those skilled in the art from this disclosure that the second lateral adjuster 134 can be part of the second tailgate mounting part 130 if needed and/or desired.

As shown more clearly in FIGS. 13 and 14, the second tailgate mounting part 130 basically includes an L-shaped bracket 136 and a pivot pin 138, while the second side mounting part 132 of the second hinge assembly 22 basically includes a bracket 156 and a cup 158. The L-shaped bracket 136 of the second tailgate mounting part 130 basically includes a lower flange 140 and a side flange 142. The lower flange 140 includes an aperture for a fastener 146 that fixes the L-shaped bracket 136 to the bottom pivotal portion 28 of the tailgate 18. The side flange 142 includes an aperture for a fastener 148 that fixes the L-shaped bracket 136 to the second lateral end 26 of the tailgate 18.

As shown in FIG. 14, the pivot pin 138 is an elongated member that basically includes a second side pivot shaft 150 that has a first end 152 and a second end 154 (FIG. 13). The second end 154 of the pivot pin 138 is fixedly attached to the side flange 142 of the L-shaped bracket 136 by welding or mechanically deforming, as shown in FIG. 13. The second end 154 of the pivot pin 138 can alternatively be attached to the L-shaped bracket 136 by a fastener (not shown). The first end 152 is pivotally supported by the second side mounting part 132, as described below.

Turning now to the second side mounting part 132 of the second hinge assembly 22, which basically includes the bracket 156 and the cup 158, as shown in FIGS. 13 and 14. The bracket 156 is fixedly attached to the second side support 16 by fasteners 160. The bracket 156 is formed with a threaded aperture 162. The cup 158 basically includes an annular shaped wall 164 and a threaded portion 166. The interior of the annular shaped wall 164 is fitted with a bushing 168. The annular shaped wall 164 is a continuous circumferentially extending wall arranged to pivotally support the pivot pin 138 of the second hinge assembly 22. The annular shaped wall 164 has a hollow interior that is fitted with the bushing 168. The first end 152 of the pivot pin 138 is dimensioned to fit into the hollow interior of the annular shaped wall 164 and the bushing 168.

Preferably, the cup 158 is adjusted after the pivot pin 38 has been adjusted so the lateral gaps $G_1$ and $G_2$ are substantially equal. Thus, the cup 158 is rotated until an appropriate amount of end play or gap $G_4$ is provide between the first end 152 of the pivot pin 138 and the cup 158.

As should be understood from the drawings and the description, after the first and second lateral adjusters 34 and 134 have been properly adjusted, the tailgate 18 can be easily removed from the vehicle 10. In particular, as seen in FIG. 5, the tailgate 18 is tilted to about a forty-five degree angle and then the pivot shaft 50 of the pivot pin 38 is removed from the cup 58 at the first side support 14 by lifting up the first lateral end 24 of the tailgate 18. Next, with the pivot shaft 50 of the pivot pin 38 removed from the cup 58 the tailgate 18 can be laterally pulled away from the second side support 16, thereby sliding the pivot pin 138 out of the cup 158 at the second side support 16, as shown in FIG. 6. Installation of the tailgate 18 includes first re-inserting the pivot pin 138 into the cup 158, then lowering the pivot pin 38 into the cup 58 at the angle shown in FIG. 6.

The second lateral adjuster 134 is basically a fine adjustment mechanism that is constituted by the threaded aperture 162 in the bracket 156 and the threaded portion 166 of the pivot pin 138. In conjunction with the first lateral adjuster 34, the second lateral adjuster 134 is also configured to adjust the lateral gaps $G_1$ and $G_2$ between the first and second side supports 14 and 16 of the tailgate support structure 12 and the first and second lateral ends 24 and 26 of the tailgate such that they are substantially equal to each other. The second lateral adjuster 134 can also be adjusted to take up endplay between the second side mounting part 132 and the second tailgate mounting part 134 to reduce or eliminate the lateral play in the first and second hinge assemblies 20 and 22. In other words, the second lateral adjuster 134 provides centering adjustment for the tailgate 18 between the first and second side supports 14 and 16 as well as reducing or eliminating lateral play between the tailgate 18 and the first and second side supports 14 and 16.

As mentioned above, the cup 164 and the threaded portion 166 are integrally formed. Since the threaded portion 166 of the cup 164 constitutes a portion of the second lateral adjuster 134, the cup 164 is rigidly supported by the second lateral adjuster 134. Since the pivot pin 138 and the cup 164 have co-acting mating surfaces that are annular in shape and generally uninterrupted, the second lateral adjuster 134 is arranged and configured to have a plurality of the final use orientations for adjustment in generally small rotational increments of approximately 1° or more. In other words, any orientation of the cup 164 is a final use orientation thereof. Hence, the second lateral adjuster 134 is in a final use orientation regardless of rotational position of the cup 164. Therefore, the second lateral adjuster 134 has a greater number of the final use orientations than the first lateral adjuster 34.

Once the second lateral adjuster 134 is adjusted, the threaded portion 166 of the cup 158 is fixed in position within the threaded aperture 162 of the bracket 156 by a thread locking material. The thread locking material is typically applied to the threaded portion 166 prior to insertion of the threaded portion 166 into the threaded aperture 162. The thread locking material can be any of a variety of materials, for example conventional thread locking compounds readily available on the market or a mild adhesive material. Preferably, the thread locking material hardens when exposed to elevated temperatures such that the thread locking material will hard during one of the manufacturing processes of in manufacturing the vehicle 10.

It should be understood from the drawings and the description herein that either one of the second side mounting part 132 or the second tailgate mounting part 130 can include the cup 158. As well, either one of the second side mounting part 132 or the second tailgate mounting part 130 can include the pivot pin 138. The locations of the pivot pin 138 and the cup 158 are interchangeable.

When the tailgate 18 is installed for the first time between the first and second side supports 14 and 16, it is desirable to adjust the lateral gaps $G_1$ and $G_2$ (FIG. 2) so that they are approximately equal thereby centering the tailgate 18 between the first and second side supports 14 and 16. Preferably, the first lateral adjuster 34 is adjusted first to laterally position the tailgate 18 as close to center as possible. Specifically, the first lateral adjuster 34 is adjusted to make the lateral gaps $G_1$ and $G_2$ as close to being equal as possible. Further, as described above, it is also preferable to have the parallel surfaces 54 of the pivot pin 38 located in their final use position. Once the lateral gaps $G_1$ and $G_2$ (FIG. 2) have been adjusted to be approximately equal using the first lateral adjuster 34, the second lateral adjuster 134 is then adjusted. Specifically, the second lateral adjuster 134 is preferably adjusted to minimize or eliminate and side-toside or lateral movement of the tailgate 18 between the first side mounting part 32 and the second side mounting part 132.

Since the first lateral adjuster 34 has two final use orientations due to the parallel surfaces 54 on the pivot pin 38, the first lateral adjuster 34 provides a course adjustment for centering the tailgate 18 between the first and second side supports 14 and 16. The second lateral adjuster 134 has many final use orientations and therefore provides a fine adjustment for centering the tailgate 18 between the first and second side supports 14 and 16 and elimination endplay.

The first and second lateral adjusters 34 and 134 provide a structure that is simple to use for centering the tailgate 18. Such adjustments can compensate for production tolerances. Further the first and second lateral adjusters 34 and 134 allow for lateral adjustment of the tailgate 18 with differing end structures that include mating hinge elements.

As used herein to describe the above embodiment, the following directional terms "forward, rearward, above, downward, vertical, horizontal, below and transverse" as well as any other similar directional terms refer to those directions of a vehicle equipped with the present invention. Accordingly, these terms, as utilized to describe the present invention should be interpreted relative to a vehicle equipped with the present invention. The terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. A tailgate support structure comprising:
   a rear vehicle structure including generally upright spaced apart first and second side supports;
   a tailgate pivotally disposed between the first and second side supports to pivot about a pivot axis between an upright closed position and a horizontal open position;
   a first hinge assembly pivotally supporting a first end of the tailgate to the first side support, the first hinge assembly including a first side mounting part coupled to the first side support and a first tailgate mounting part coupled to the first end of the tailgate with one of the first side mounting part and the first tailgate mounting part having a first lateral adjuster arranged and configured to adjust a lateral position of the tailgate along the pivot axis between the first and second side supports, the first lateral adjuster including a threaded portion engaged within a threaded hole in one of the first side mounting part and the first tailgate mounting part; and
   a second hinge assembly pivotally supporting a second end of the tailgate to the second side support, the second hinge assembly including a second side mounting part coupled to the second side support and a second tailgate mounting part coupled to the second end of the tailgate with one of the second side mounting part and the second tailgate mounting part having a second lateral adjuster being arranged and configured to adjust the lateral position of the tailgate along the pivot axis between the first and second side supports.

2. The tailgate support structure as set forth in claim 1, wherein
   the first lateral adjuster is configured to adjust a lateral gap between the first side mounting part and the first tailgate mounting part to take up play between the first side mounting part and the first tailgate mounting part, and
   the second lateral adjuster is configured to adjust a lateral gap between the second side mounting part and the second tailgate mounting part to take up play between the second side mounting part and second tailgate mounting part.

3. The tailgate support structure as set forth in claim 1, wherein the second lateral adjuster includes a threaded portion engaged within a threaded hole in one of the second side mounting part and the second tailgate mounting part.

4. The tailgate support structure as set forth in claim 1, wherein
   one of the first side mounting part and the first tailgate mounting part includes a cup and the other of the first side mounting part and the first tailgate mounting part includes a pin, with the pin being removably supported by the cup.

5. The tailgate support structure as set forth in claim 4, further comprising:
   a bushing disposed within the cup configured to receive the pin.

6. The tailgate support structure as set forth in claim 1, wherein
   one of the first side mounting part and the first tailgate mounting part is rotatable by the first lateral adjuster to move in an axial direction along the pivot axis; and
   one of the second side mounting part and the second tailgate mounting part is rotatable by the second lateral adjuster to move in the axial direction along the pivot axis.

7. The tailgate support structure as set forth in claim 6, wherein
   the first lateral adjuster is configured and arranged to move one of the first side mounting part and the first tailgate mounting part between at least one non-use orientation of the first side mounting part and the first tailgate mounting part and at least one final use orientation such that the first side mounting part and the first tailgate mounting part have a predetermined use relationship in the final use orientation that is different from the non-use orientation.

8. The tailgate support structure as set forth in claim 7, wherein
   the first lateral adjuster provides centering adjustment for the tailgate between the first and second side supports; and
   the second lateral adjuster provides endplay reducing adjustment between the tailgate and the first and second side supports.

9. A tailgate support structure comprising:
   a rear vehicle structure including generally upright spaced apart first and second side supports:
   a tailgate pivotally disposed between the first and second side supports to pivot about a pivot axis between an upright closed position and a horizontal open position;

a first hinge assembly pivotally supporting a first end of the tailgate to the first side support, the first hinge assembly including a first side mounting part coupled to the first side support and a first tailgate mounting part coupled to the first end of the tailgate with one of the first side mounting part and the first tailgate mounting part having a first lateral adjuster arranged and configured to adjust a lateral position of the tailgate along the pivot axis between the first and second side supports.

one of the first side mounting part and the first tailgate mounting part being rotatable by the first lateral adjuster to move in an axial direction along the pivot axis, the first lateral adjuster being configured and arranged to move one of the first side mounting part and the first tailgate mounting part between at least one non-use orientation of the first side mounting part and the first tailgate mounting part and at least one final use orientation such that the first side mounting part and the first tailgate mounting part have a predetermined use relationship in the final use orientation that is different from the non-use orientation, the first lateral adjuster providing a course adjustment for positioning the tailgate between the first and second side supports; and a second hinge assembly pivotally supporting a second end of the tailgate to the second side support, the second hinge assembly including a second side mounting part coupled to the second side support and a second tailgate mounting part coupled to the second end of the tailgate with one of the second side mounting part and the second tailgate mounting part having a second lateral adjuster being arranged and configured to adjust the lateral position of the tailgate along the pivot axis between the first and second side supports, with one of the second side mounting part and the second tailgate mounting part being rotatable by the second lateral adjuster to move in the axial direction along the pivot axis, the second lateral adjuster providing a fine adjustment for positioning the tailgate between the first and second side supports.

10. A tailgate support structure comprising:

a rear vehicle structure including generally upright spaced apart first and second side supports;

a tailgate pivotally disposed between the first and second side supports to pivot about a pivot axis between an upright closed position and a horizontal open position;

a first hinge assembly pivotally supporting a first end of the tailgate to the first side support, the first hinge assembly including a first side mounting part coupled to the first side support and a first tailgate mounting part coupled to the first end of the tailgate with one of the first side mounting part and the first tailgate mounting part having a first lateral adjuster arranged and configured to adjust a lateral position of the tailgate along the pivot axis between the first and second side supports, one of the first side mounting part and the first tailgate mounting part being rotatable by the first lateral adjuster to move in an axial direction along the pivot axis, the first lateral adjuster being configured and arranged to move one of the first side mounting part and the first tailgate mounting part between at least one non-use orientation of the first side mounting part and the first tailgate mounting part and at least one final use orientation such that the first side mounting part and the first tailgate mounting part have a predetermined use relationship in the final use orientation that is different from the non-use orientation, the first lateral adjuster being arranged and configured to have two of the final use orientations for adjustment in 180° rotational increments; and a second hinge assembly pivotally supporting a second end of the tailgate to the second side support, the second hinge assembly including a second side mounting part coupled to the second side support and a second tailgate mounting part coupled to the second end of the tailgate with one of the second side mounting part and the second tailgate mounting part having a second lateral adjuster being arranged and configured to adjust the lateral position of the tailgate along the pivot axis between the first and second side supports, with one of the second side mounting part and the second tailgate mounting part being rotatable by the second lateral adjuster to move in the axial direction along the pivot axis.

11. The tailgate support structure as set forth in claim 10, wherein the second lateral adjuster is arranged and configured to move one of the second side mounting part and the second tailgate mounting part to any one of a plurality of final use orientations, the second lateral adjuster having a greater number of the final use orientations than the first lateral adjuster.

12. The tailgate support structure as set forth in claim 10, wherein one of the first side mounting part and the first tailgate mounting part includes a pin having parallel surfaces formed on a portion thereof, and the parallel surfaces are generally parallel to the tailgate in the final use orientation.

13. A tailgate support structure comprising:

a rear vehicle structure including generally upright spaced apart first and second side supports;

a tailgate pivotally disposed between the first and second side supports to pivot about a pivot axis between an upright closed position and a horizontal open position;

a first hinge assembly pivotally supporting a first end of the tailgate to the first side support, the first hinge assembly including a first side mounting part coupled to the first side support and a first tailgate mounting part coupled to the first end of the tailgate with the first tailgate mounting part having a first lateral adjuster arranged and configured to adjust a lateral position of the tailgate along the pivot axis between the first and second side supports, the first side mounting part including a cup and the first tailgate mounting part including a pin, with the pin being removably supported by the cup, the pin being fixedly attached to the first lateral adjuster and the first lateral adjuster including a threaded portion engaged within a threaded hole in the first tailgate mounting part of the first hinge assembly;

a second hinge assembly pivotally supporting a second end of the tailgate to the second side support, the second hinge assembly including a second side mounting part coupled to the second side support and a second tailgate mounting part coupled to the second end of the tailgate with one of the second side mounting part and the second tailgate mounting part having a second lateral adjuster being arranged and configured to adjust the lateral position of the tailgate along the pivot axis between the first and second side supports.

14. The tailgate support structure as set forth in claim 13, wherein
the threaded portion is fixed in place with a thread locking material within the threaded hole.

15. The tailgate support structure as set forth in claim 13, further comprising:
a bushing disposed within the cup configured to receive the pin.

16. A tailgate support structure comprising:
a rear vehicle structure including generally upright spaced apart first and second side supports;
a tailgate pivotally disposed between the first and second side supports to pivot about a pivot axis between an upright closed position and a horizontal open position;
a first hinge assembly pivotally supporting a first end of the tailgate to the first side support, the first hinge assembly including a first side mounting part coupled to the first side support and a first tailgate mounting part coupled to the first end of the tailgate with one of the first side mounting part and the first tailgate mounting part having a first lateral adjuster arranged and configured to adjust a lateral position of the tailgate along the pivot axis between the first and second side supports, one of the first side mounting part and the first tailgate mounting part includes a cup and the other of the first side mounting part and the first tailgate mounting part includes a pin, with the pin being removably supported by the cup, the pin including a pivot shaft, portions of the pivot shaft having generally parallel surfaces formed thereon, the generally parallel surface being spaced apart from one another by a first width;
a second hinge assembly pivotally supporting a second end of the tailgate to the second side support, the second hinge assembly including a second side mounting part coupled to the second side support and a second tailgate mounting part coupled to the second end of the tailgate with one of the second side mounting part and the second tailgate mounting part having a second lateral adjuster being arranged and configured to adjust the lateral position of the tailgate along the pivot axis between the first and second side supports.

17. The tailgate support structure as set forth in claim 16, further comprising:
a bushing disposed within the cup configured to receive the pin.

18. The tailgate support structure as set forth in claim 16, wherein
the cup includes an annular shaped wall formed with a gap having a second width measured in a circumferential direction, the second width being slightly larger than the first width thereby allowing removal and installation of the pin in the cup.

19. The tailgate support structure as set forth in claim 18, wherein
the pin and cup are arranged and configured such that the pin is removable from the cup with the generally parallel surfaces oriented generally perpendicular to the circumferential direction of the gap in the cup.

20. The tailgate support structure as set forth in claim 16, wherein
one of the second side mounting part and the second tailgate mounting part includes a second side cup and the other of the second side mounting part and the second tailgate mounting part includes a second side pin, with the second side pin being removably supported by the second side cup.

21. The tailgate support structure as set forth in claim 20, wherein
the second side cup is formed with a continuous circumferentially extending wall arranged to retain the pin of the second hinge assembly.

22. The tailgate support structure as set forth in claim 21, wherein
the second side pin comprises a second side pivot shaft, a first end of the second side pivot shaft being supported within the second side cup, and a second end of the second side pivot shaft being fixedly attached to the second tailgate mounting part of the second hinge assembly.

23. The tailgate support structure as set forth in claim 20, wherein
the second side cup is fixedly attached to the second lateral adjuster; and
the second lateral adjuster comprises a threaded portion engaged within a threaded hole in the second side mounting part of the second hinge assembly.

24. The tailgate support structure as set forth in claim 23, wherein
the threaded portion is fixed in place with a thread locking material within the threaded hole.

25. A tailgate support structure comprising:
a rear vehicle structure including generally upright spaced apart first and second side supports;
a tailgate pivotally disposed between the first and second side supports to pivot about a pivot axis between an upright closed position and a horizontal open position;
a first hinge assembly pivotally supporting a first end of the tailgate to the first side support, the first hinge assembly including a first side mounting part coupled to the first side support and a first tailgate mounting part coupled to the first end of the tailgate with one of the first side mounting part and the first tailgate mounting part having a first lateral adjuster arranged and configured to adjust a lateral position of the tailgate along the pivot axis between the first and second side supports, the first lateral adjuster including a threaded portion engaged within a threaded hole in one of the first side mounting part and the first tailgate mounting part; and
a second hinge assembly releasably and pivotally supporting a second end of the tailgate to the second side support.

26. The tailgate support structure as set forth in claim 25, wherein
the second hinge assembly includes a second side mounting part coupled to the second side support and a second tailgate mounting part coupled to the second end of the tailgate with one of the second side mounting part and the second tailgate mounting part having a second lateral adjuster being arranged and configured to adjust the lateral position of the tailgate along the pivot axis between the first and second side supports.

27. The tailgate support structure as set forth in claim 26, wherein
the second lateral adjuster includes a threaded portion engaged within a threaded hole in one of the second side mounting part and the second tailgate mounting part.

28. The tailgate support structure as set forth in claim 25, wherein
the first tailgate mounting part includes a support bracket fixed to a main frame of the tailgate, the support bracket having attachment parts and a flange portion extending therebetween, the flange portion being spaced apart from the tailgate.

29. The tailgate support structure as set forth in claim 28, wherein the pivot axis extends through the support bracket and is spaced apart from the main frame of the tailgate.

30. The tailgate support structure as set forth in claim 28, wherein the flange portion of the support bracket includes an offset portion laterally offset from at least one of the attachment parts, the first lateral adjuster being coupled to the offset portion.

31. The tailgate support structure as set forth in claim 28, wherein a first of the attachment parts of the support bracket is attached to a lateral side of the tailgate and a second of the attachment parts is attached to a lower portion of the tailgate.

* * * * *